Dec. 25, 1962

J. W. PICKARD ETAL 3,070,103

BEARING TREATING APPARATUS

Filed July 28, 1958

INVENTORS
JAMES W. PICKARD
EDGAR M. MacDONALD
BY
ATTORNEYS

Dec. 25, 1962 J. W. PICKARD ETAL 3,070,103
BEARING TREATING APPARATUS
Filed July 28, 1958 3 Sheets-Sheet 2

INVENTORS
JAMES W. PICKARD
BY EDGAR M. MacDONALD

ATTORNEYS

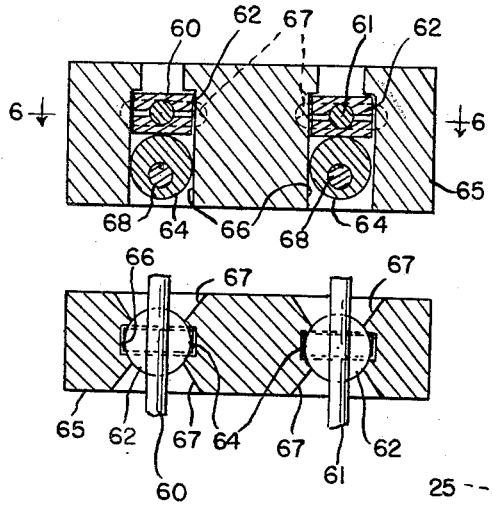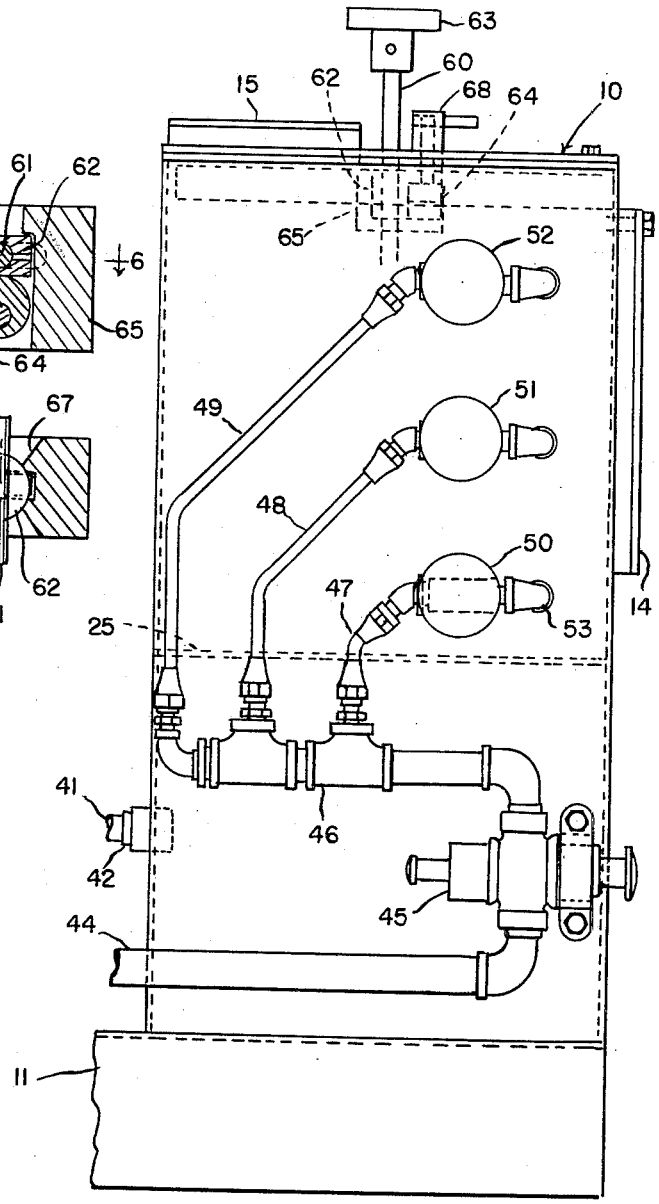

3,070,103
BEARING TREATING APPARATUS
James W. Pickard, Petersburg, and Edgar M. MacDonald, Monroe, Mich., assignors to Continental Aviation and Engineering Corporation, Detroit, Mich., a corporation of Virginia
Filed July 28, 1958, Ser. No. 751,486
5 Claims. (Cl. 134—107)

Our invention relates to bearing treating apparatus and more particularly to an apparatus for rapid cleaning and selective hot oil treating of finished bearing elements.

Bearings, particularly expensive precision bearings such as are used in high speed turbine engines and the like, must be absolutely clean before installation, and manufacturing losses due simply to unnoticed dirt which finds its way into bearings, causing ultimate failure and damage, represent a considerable factor in costs. Hand cleaning, as heretofore used, is unsatisfactory, and various cleaning apparatus heretofore have generally proven to be either unreliable and/or expensive, as well as often being inconvenient to use.

An object of the present invention is to insure elimination of foreign matter from bearings by providing a simplified and reliable cleaning apparatus.

Another object of the invention is to increase bearing life by providing an improved bearing cleaning and treating apparatus.

A further object of the invention is to materially reduce losses in manufacturing caused by foreign matter lodging in bearings prior to installation by constructing a simplified apparatus operable to rotate a bearing in a selectively directed discharge of cleaning oil.

Yet another object of the invention is to improve bearing treating apparatus by providing a closed cabinet adapted to clean and treat bearings in a wide variety of sizes and having external controls.

A still further object of the invention is to facilitate rapid treating of bearings by constructing a cabinet having an area in which a bearing may be mounted for treating and connected with a self-contained fluid circulating system.

For a more complete understanding of the invention, reference may be had to the accompanying drawings illustrating a preferred embodiment of the invention in which like reference characters refer to like parts throughout the several views and in which FIG. 1 is a top plan view of a preferred apparatus embodying the invention.

FIG. 3 is a side elevational view of the apparatus as seen from the line 3—3 of FIG. 1.

FIG. 5 is a cross sectional view taken substantially on the line 5—5 of FIG. 2; and FIG. 6 is a cross sectional view taken substantially on the line 6—6 of FIG. 5.

Figure 1:
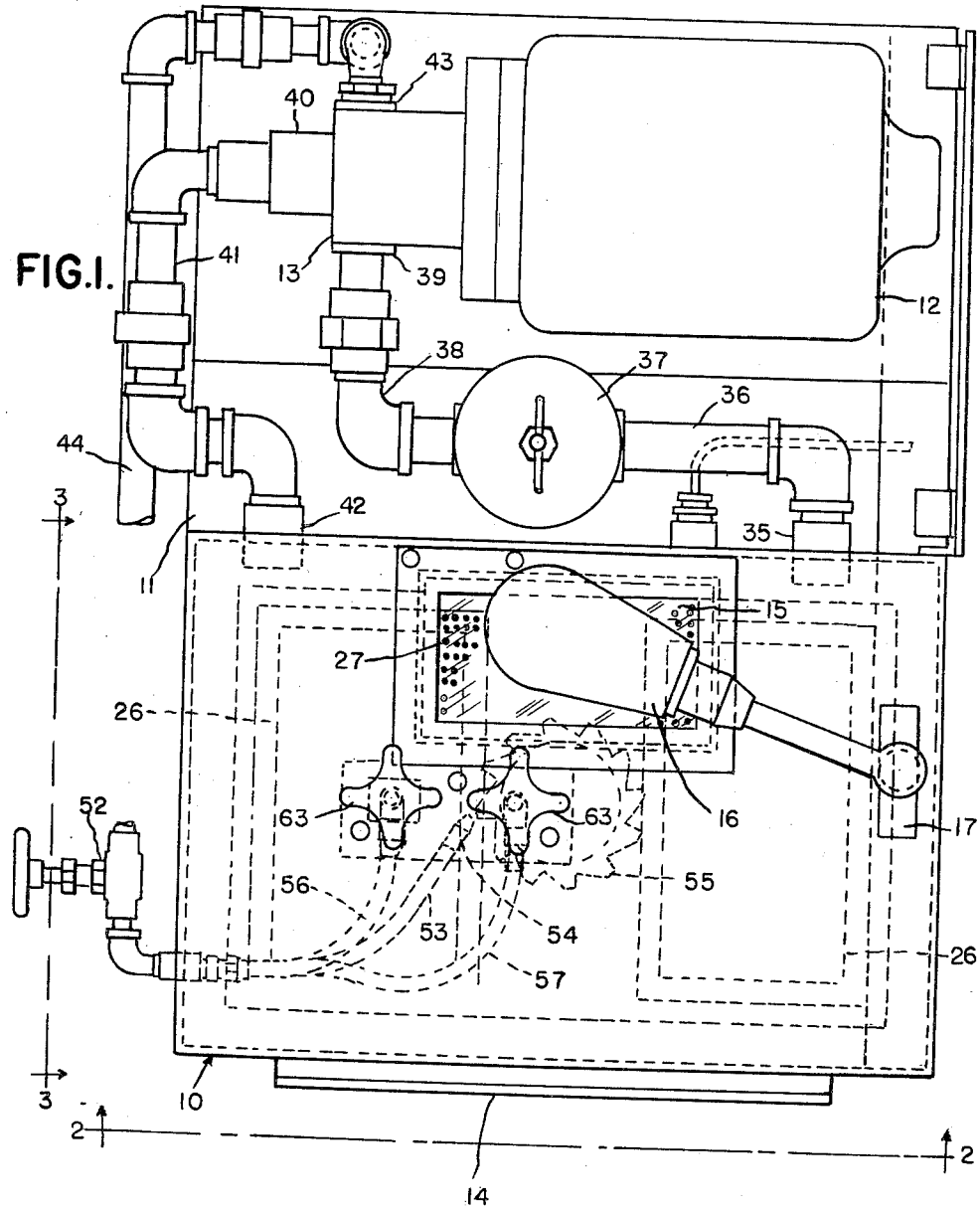

As illustrated in the drawings, the preferred embodiment of the invention comprises a cabinet 10 mounted on a base 11 which also supports other equipment such as a motor 12 driving a fluid pump 13.

The cabinet 10 is preferably box-like as shown, and has a viewing window 14 in the front side, a top window 15 through which a light 16, preferably mounted on a bracket 17 secured to the cabinet, can illuminate the interior of the cabinet 10.

Figure 2:
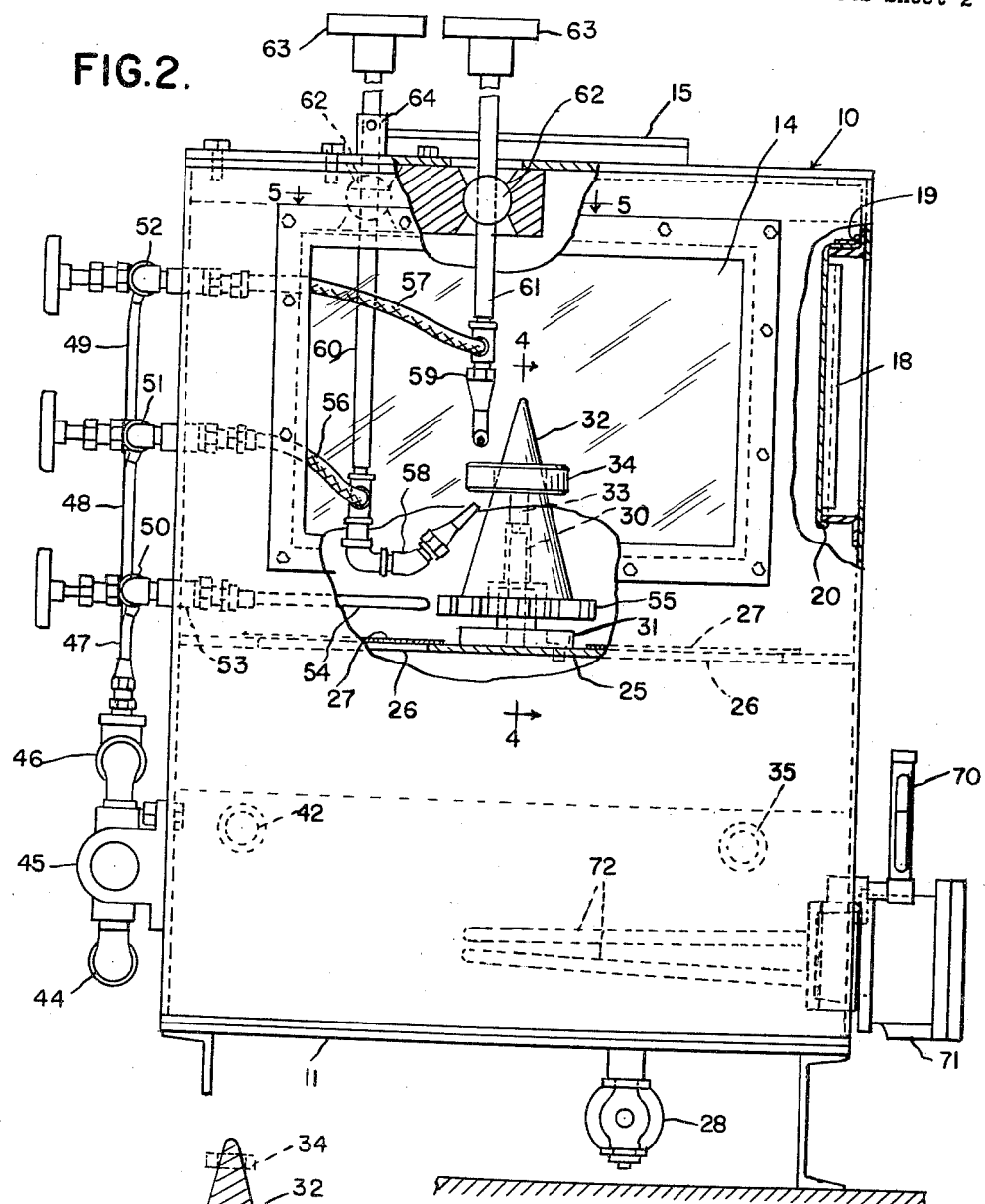
FIG. 2 is a front elevational view, partly in section, of the apparatus as seen from the line 2—2 of FIG. 1.

A recessed access door 18 is hinged as at 19 to a side of the cabinet 10, as shown in FIG. 2, preferably having an outer lip 20 which overlaps the access hole it covers to prevent fluid from splashing out of the cabinet.

The cabinet 10 is divided by a lateral partition 25 into upper and lower portions, the lower portions serving as a reservoir for fluid, and suitable drains 26, preferably having perforated covers 27, are provided to drain fluid from the upper into the lower cabinet. A drain valve 28 is also preferably installed in the bottom of the cabinet 10.

Figure 4:
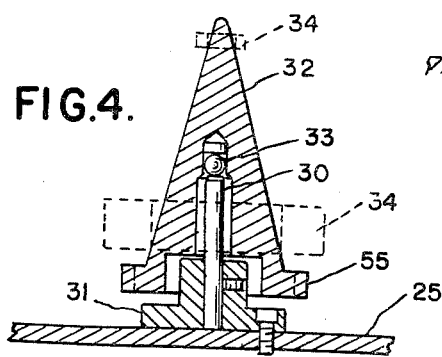
FIG. 4 is a cross-sectional detail view taken substantially on the line 4—4 of FIG. 2.

As illustrated in FIGS. 2 and 4, a spindle 30 is secured to a base member 31 which is mounted on the partition 25. A cone-shaped bearing support member 32 is preferably rotatably balanced on the spindle by means of an internal bearing ball 33 which rests on top of the spindle 30, providing for exceptionally trouble-free operation and easy rotation. The member 32 being cone shaped, provides for the supporting of a great variety of sizes of bearings 34 as illustrated by the dotted lines of FIG. 4. It will be seen that the cone shape of member 32 also ensures centering of the bearing 34.

Oil is the preferred fluid used for cleaning and treating the bearings 34, and a sufficient supply is maintained within the lower portion of the cabinet 10. The cabinet 10 is provided with an outlet 35 connected by a pipe 36 to a filter 37 which is connected by a pipe 38 to the intake 39 of the pump 13. A bypass outlet 40 is connected by a pipe 41 to an inlet 42 of the cabinet 10. A pressure outlet 43 of the pump 13 is connected by a pipe 44 to a valve 45 which, when open, directs oil under pressure into a manifold 46, as shown in FIG. 3.

The manifold 46 directs oil preferably to three pipes 47, 48 and 49 which are respectively connected to three valves 50, 51 and 52, mounted on the side of the cabinet 10. A pipe 53 extends within the cabinet 10 from the valve 50 and directs oil from a nozzle 54 substantially tangentially against a vaned flange 55 at the base of the member 32, being operable to spin the member 32 at high velocity.

Two flexible conduits 56 and 57 extend into the cabinet 10 respectively from the valves 51 and 52 to nozzle assemblies 58 and 59 respectively, the nozzle assembly 58 directs oil substantially upward and the nozzle assembly 59 directs oil substantially downward, as indicated in FIG. 2. The nozzle assemblies 58 and 59 are respectively mounted on rods 60 and 61, each extending through a swivel mounting 62 and having a control handle 63 exteriorly of the cabinet. The swivel mountings 62 permit the nozzles 58 and 59 to be pivoted toward and away from the cone member 32 such that the oil discharge may be selectively aimed at the part of the bearing 34, such as between the faces, which requires it, depending on the size of the bearing 34.

The rods 60 and 61 are also vertically slidable in the mountings 62 to permit adjusting the nozzles in accordance with the position of the bearing 34 on the rotating member 32. The mountings 62 each have a cam lock element 64, as shown in FIGS. 5 and 6 for locking the rods 60 and 61 in place.

As illustrated in FIGS. 5 and 6, the swivel mountings 62 are supported by a block 65 which has a slot 66 in which the cam element 64 is disposed and tapered slots 67 in which the rods 60 may swivel. Each mounting 62 is in two parts and the respective cam 64 bears on one part to clamp the rod in place against vertical displacement, the cams 62 being turned by means of a lever 68 extending through the top of the cabinet 10.

The valves 50, 51 and 52 may be selectively adjusted to regulate the discharge of oil from the nozzles 54, 58 and 59 respectively. The valve 45 is preferably operated to an on or off position, and when turned off, blocking flow of oil, the pump 13 then pumps the oil through the bypass outlet 40 back to the lower portion of the cabinet 10.

A level indicating gauge 70 is preferably mounted on the side of the cabinet 10 as shown in FIG. 2, and a heating unit 71 mounted on the side of the cabinet 10 has heating elements 72 extending into the cabinet and immersed in the oil as shown. This provides means for preheating the oil when hot oil treatment of the bearing 34 is required.

In operation, a bearing 34 is inserted through the access door 18 and positioned on the cone member 32 as shown. The nozzles 58 and 59 are adjusted as desired, and the valve 45 turned on. Oil discharged from the nozzle 54 spins the member 32, with the bearing 34 thereon, and oil discharged from the nozzles 58 and 59 against the bearing cleans and treats same as it is rotated in the oil streams. The nozzles 58 and 59 may be adjusted as desired during operation from outside the cabinet by adjusting the rods 60 and 61 respectively to direct the oil against the rotating bearing in any direction, preferably impinging on said outer race thereof to induce same to turn or rotate in a direction relative or actually opposite to the rotation of the inner race which is turned by the cone 32. The bearing inner race bears on the conical support 32. FIG. 2 illustrates this and it is noted that nozzle 59 directs the oil against the bearing in an opposed direction to the nozzle 54, or in other words, it rotates the outer bearing race at a different or opposite speed from the inner face, and the oil flow may also be regulated from outside the cabinet by means of the valves 50 and 51 and 52. The oil is continuously circulated by the pump 13 and filtered by the filter 37.

Although we have described only one preferred embodiment of our invention, it will be apparent to one skilled in the art to which the invention pertains that various changes and modifications may be made therein without departing from the spirit of the invention or the scope of the appended claims.

We claim:

1. A bearing treating apparatus comprising a closed cabinet having a compartment, a bearing support rotatably mounted within said compartment, a fluid pressure system comprising a fluid manifold, a plurality of fluid nozzles connected with the fluid manifold, and a fluid pressure pump for pumping a cleaning fluid under pressure to said fluid nozzles, means rotating said bearing support in one direction, means adjustably supporting a plurality of said nozzles in said cabinet and locating same to direct cleaning fluid to a bearing carried by said bearing support, said bearing comprising a structure having an inner and an outer bearing race, said bearing support being engageable with the inner bearing race, said inner bearing race being rotatable with said bearing support and having substantially the same axis of rotation as said bearing support, at least one of said fluid nozzles being angularly adjustable to direct fluid tangentially against the outer periphery of said outer bearing race to rotate same relative to the inner bearing race.

2. A bearing treating apparatus comprising a closed cabinet having a compartment, a bearing support rotatably mounted within said compartment, a fluid pressure system comprising a fluid manifold, a plurality of fluid nozzles connected with the fluid manifold, and a fluid pressure pump for pumping a cleaning fluid under pressure to said fluid nozzles, means rotating said bearing support in one direction, means adjustably supporting a plurality of said nozzles in said cabinet and locating same to direct cleaning fluid to a bearing carried by said bearing support, said bearing comprising a structure having an inner and an outer race, said bearing support being engageable with an inner bearing race and rotatable with said bearing support, said bearing support comprising a vaned element, one of said fluid nozzles directing fluid against said vaned element to rotate same, said other fluid nozzles adjustably positioned to direct fluid under pressure to said bearing and at least one of said other fluid nozzles directing fluid against said outer bearing race to rotate same relative to the inner bearing race.

3. A bearing treating apparatus comprising a closed cabinet having a compartment, a bearing support rotatably mounted within said compartment, a fluid pressure system comprising a fluid manifold, a plurality of fluid nozzles connected with the fluid manifold, and a fluid pressure pump for pumping a cleaning fluid under pressure to said fluid nozzles, means rotating said bearing support in one direction, means adjustably supporting a plurality of said nozzles in said cabinet and locating same to direct cleaning fluid to a bearing carried by said bearing support, said bearing comprising a structure having an inner and an outer race, said bearing support being engageable with the inner bearing race and rotatable with said bearing support, said bearing support comprising a vaned element, one of said fluid nozzles directing fluid against said vaned element to rotate same, said other fluid nozzles adjustably positioned to direct fluid under pressure to said bearing and at least one of said other fluid nozzles directing fluid against said outer bearing race to rotate same relative to the inner bearing race, one of said other fluid nozzles adjustably positioned underneath said bearing to direct fluid against said inner bearing race, and at least one of said other fluid nozzles adjustably positioned above said bearing to direct fluid against said outer bearing race.

4. A bearing treating apparatus as described in claim 1 in which said fluid pressure system includes storage means for said cleaning fluid and means within said storage means to selectively heat said cleaning fluid and to maintain a desired temperature thereof.

5. A bearing treating apparatus as described in claim 1 and including means located exteriorly of said cabinet operable to adjust and control the position of said nozzle means.

References Cited in the file of this patent

UNITED STATES PATENTS

| | | |
|---|---|---|
| 803,097 | De Laney | Oct. 31, 1905 |
| 993,602 | Johnston | May 30, 1911 |
| 1,712,751 | Cunningham | May 14, 1929 |
| 1,838,634 | Peterson | Dec. 29, 1931 |
| 1,857,766 | Peterson | May 10, 1932 |
| 1,941,915 | Rosenberger | Jan. 2, 1934 |
| 2,471,506 | Wiswall | May 31, 1949 |
| 2,699,793 | Buck | Jan. 18, 1955 |
| 2,823,682 | Coulter | Feb. 18, 1958 |